6 Sheets—Sheet 1

I. LANCASTER,

Assignor, by mesne assignments, to McCormick Harvesting Machine Co.

Grain Binder.

No. 9,634. Reissued April 5, 1881.

Attest:
H. L. Perrine
Dan'l Kelly.

Inventor.
Israel Lancaster
By Poxxiwon & Poxxiwon
Attorneys

6 Sheets—Sheet 2.

I. LANCASTER,

Assignor, by mesne assignments, to McCormick Harvesting Machine Co.

Grain Binder.

No. 9,634. Reissued April 5, 1881.

Attest:
H. L. Pierce.
Dan'l Kelly.

Inventor:
Israel Lancaster
By Dewitson & Dewitson
Attorneys

I. LANCASTER,

Assignor, by mesne assignments, to McCormick Harvesting Machine Co.

Grain Binder.

No. 9,634. Reissued April 5, 1881.

Attest:
H. C. Perrine
Dan'l Kelly

Inventor.
Israel Lancaster
By Pennington & Pennington Attorneys

I. LANCASTER,

Assignor, by mesne assignments, to McCormick Harvesting Machine Co.

Grain Binder.

No. 9,634. Reissued April 5, 1881

Attest:
H. L. Pennie
Daniel Kelly.

Inventor:
Isaac Lancaster
By Poreinson & Poreinson
Attorneys

I. LANCASTER,
Assignor, by mesne assignments, to McCormick Harvesting Machine Co.
Grain Binder.
No. 9,634. Reissued April 5, 1881.
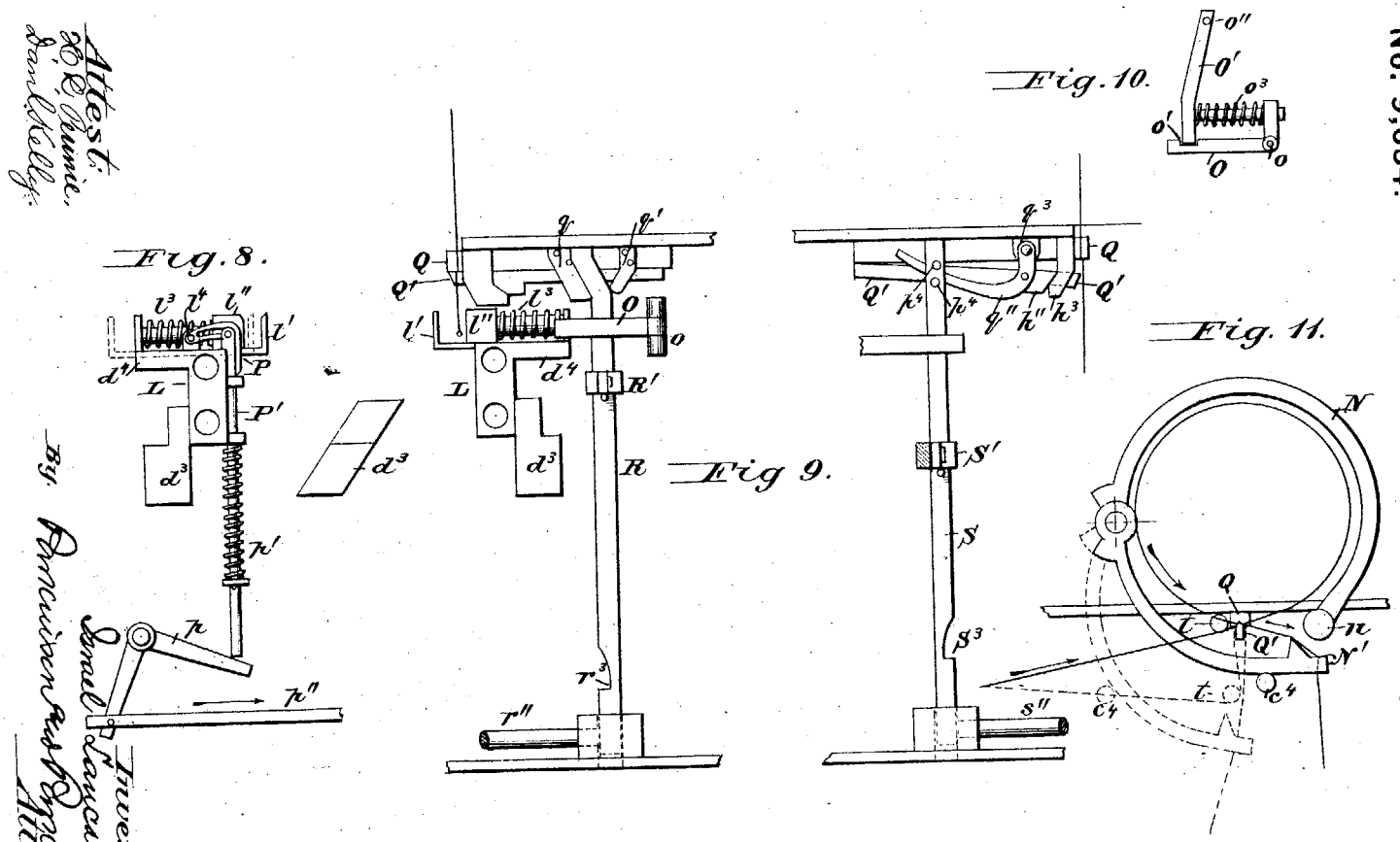
Attest:
H. R. Prunie,
Dan'l Kelly.
Inventor.
Israel Lancaster
By Pancoast & Pancoast
Attorneys

I. LANCASTER,
Assignor, by mesne assignments, to McCORMICK HARVESTING MACHINE Co.
Grain Binder.
No. 9,634. Reissued April 5, 1881.
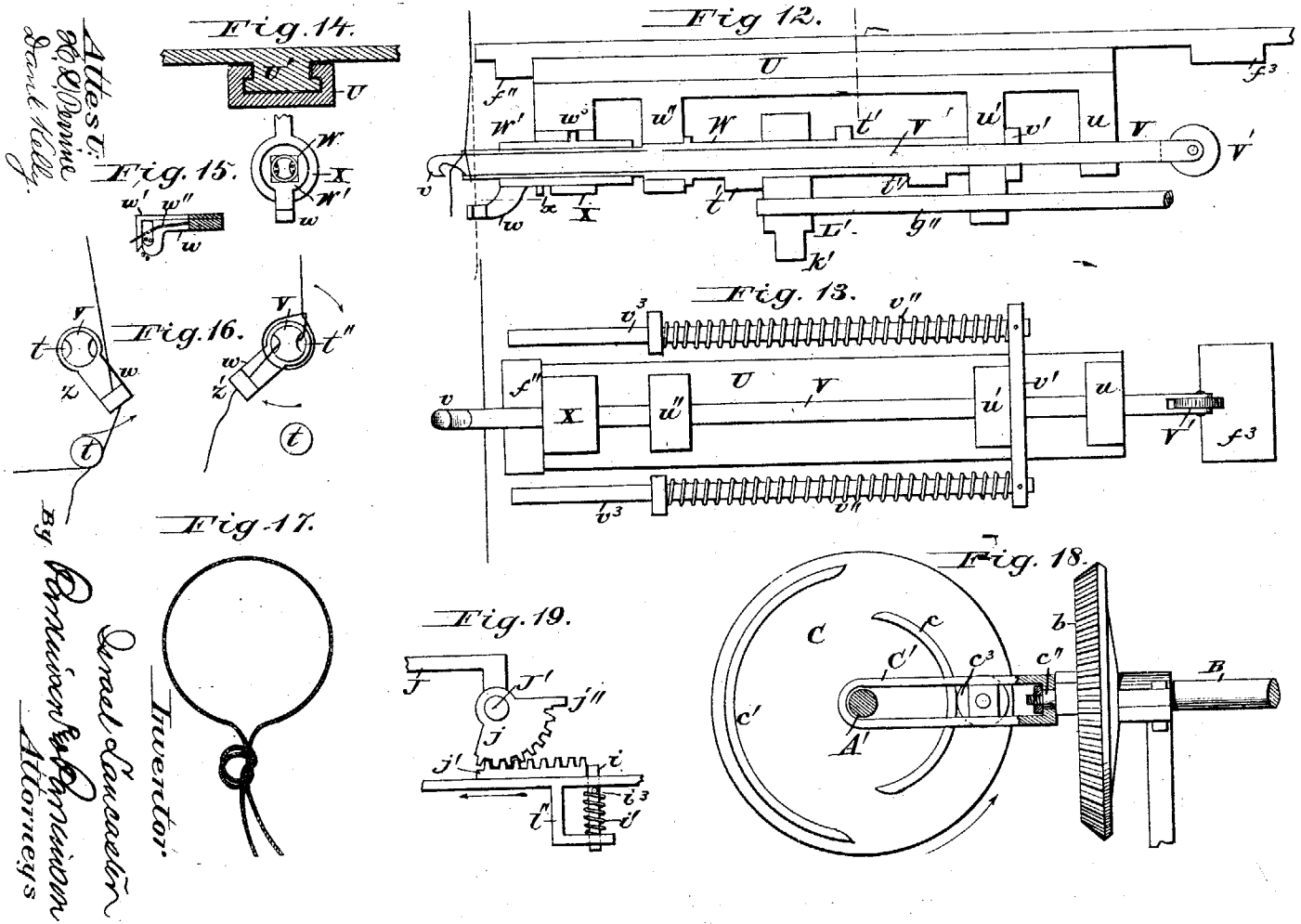

UNITED STATES PATENT OFFICE.

ISRAEL LANCASTER, OF SARASOTA, FLORIDA, ASSIGNOR, BY MESNE ASSIGNMENTS, TO McCORMICK HARVESTING MACHINE COMPANY, OF CHICAGO, ILLINOIS.

GRAIN-BINDER.

SPECIFICATION forming part of Reissued Letters Patent No. 9,634, dated April 5, 1881.

Original No. 54,177, dated April 24, 1866. Application for reissue filed July 17, 1880.

*To all whom it may concern:*

Be it known that I, ISRAEL LANCASTER, formerly of Baltimore, in the State of Maryland, but now of Sarasota, in the county of Manatee and State of Florida, have invented certain new and useful Improvements in Machines for Binding Grain, of which the following is a specification.

My invention relates to automatic machines which are intended to be applied to any reaper to bind the grain as it is cut and delivered, and to be operated by connection with some driven part of the reaper; and it consists in improved knot-tying devices to secure the ends of the band after they have been passed around the sheaf; in the interposition of a clamp between the gavel and the knotter to temporarily hold the ends of the band while the knot is being formed; in a finger independent of the binder-arm to assist in placing the ends of the band in position to be seized by the tying device; in improved means for tightening the knot after the strands have been laid, and in various combinations and details of construction hereinafter described.

Figure 1:
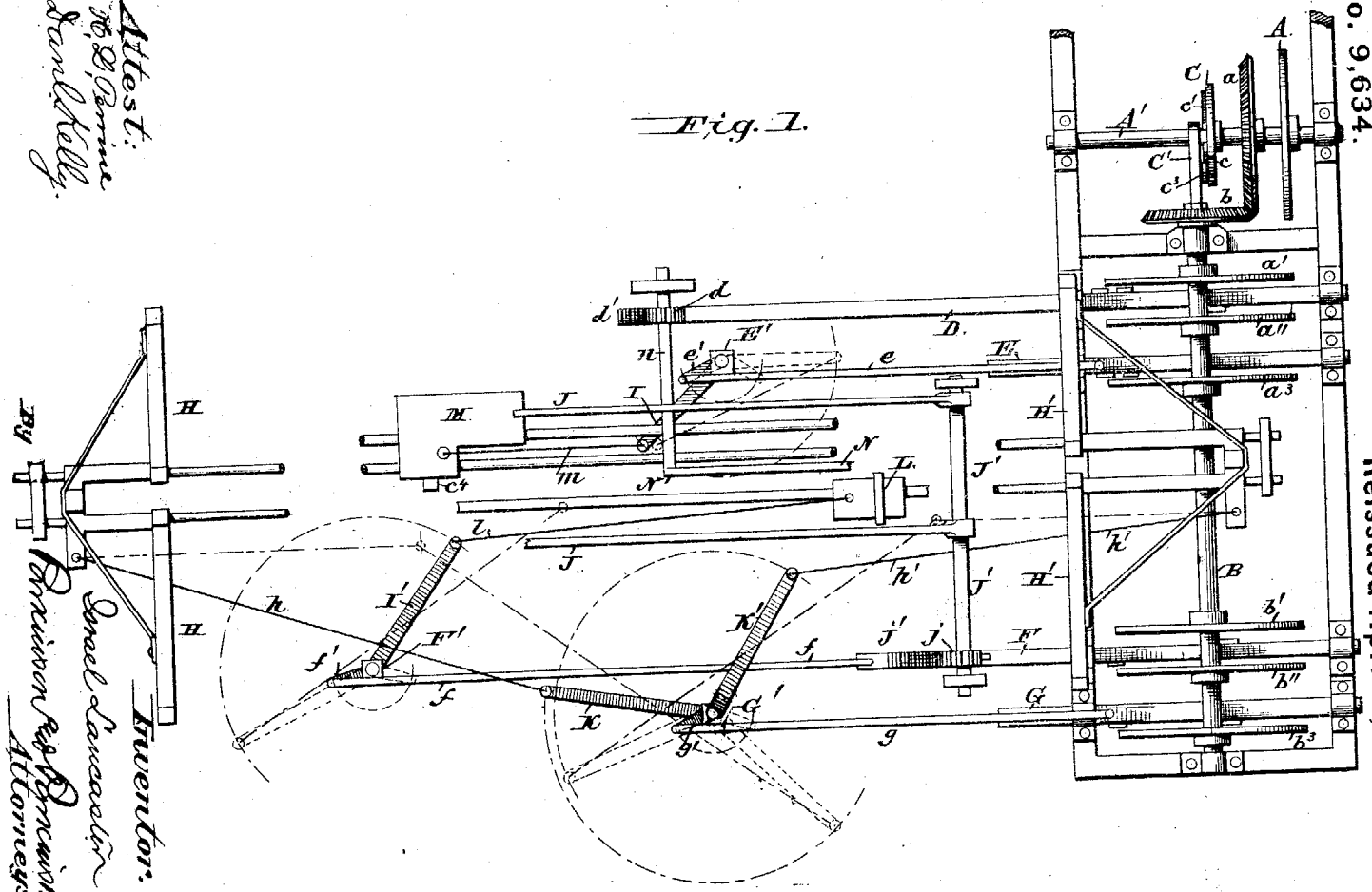
Figure 2:
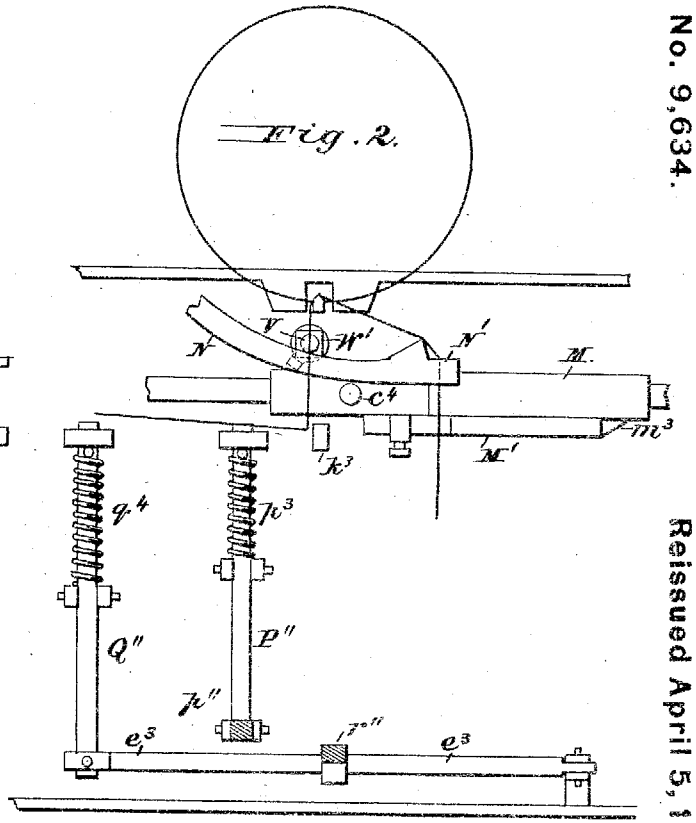
Figure 3:
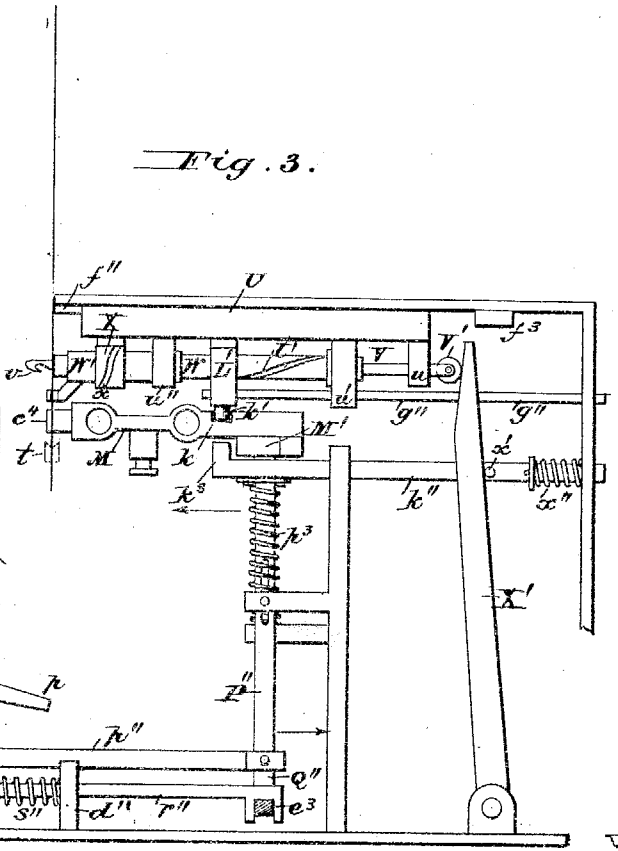
Figure 5:
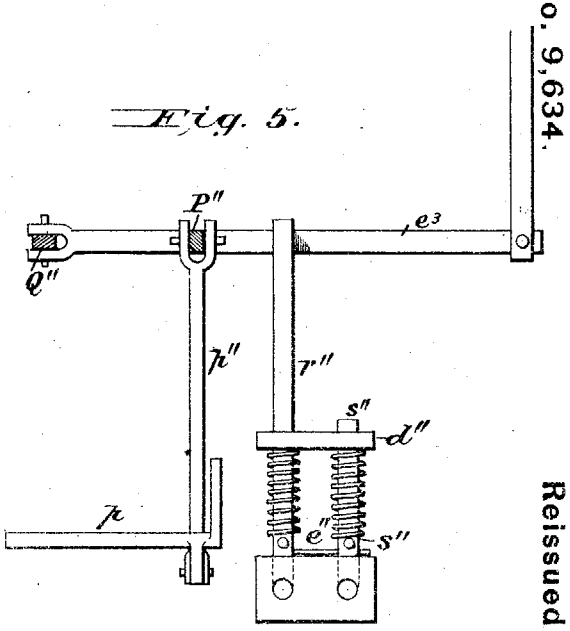
Figure 4:
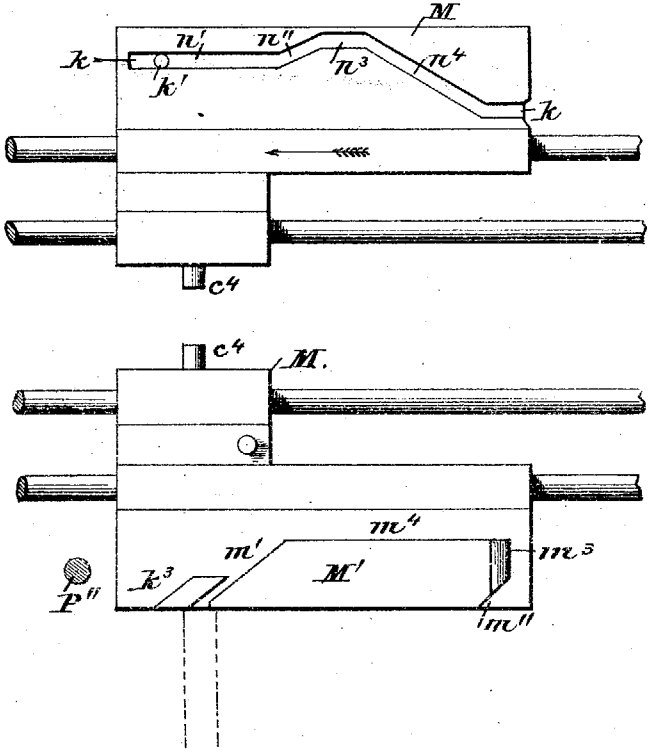
Figure 7:
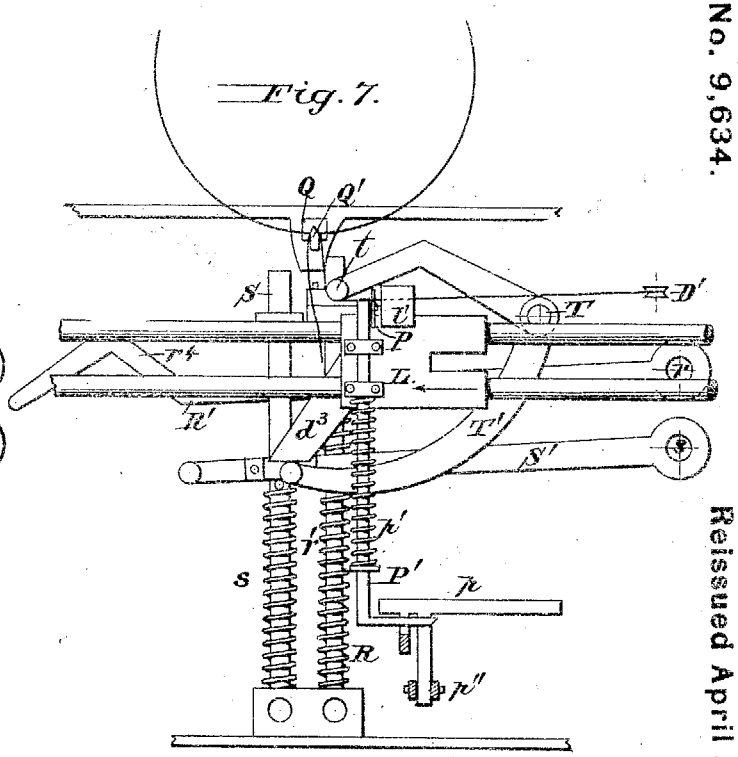
Figure 6:
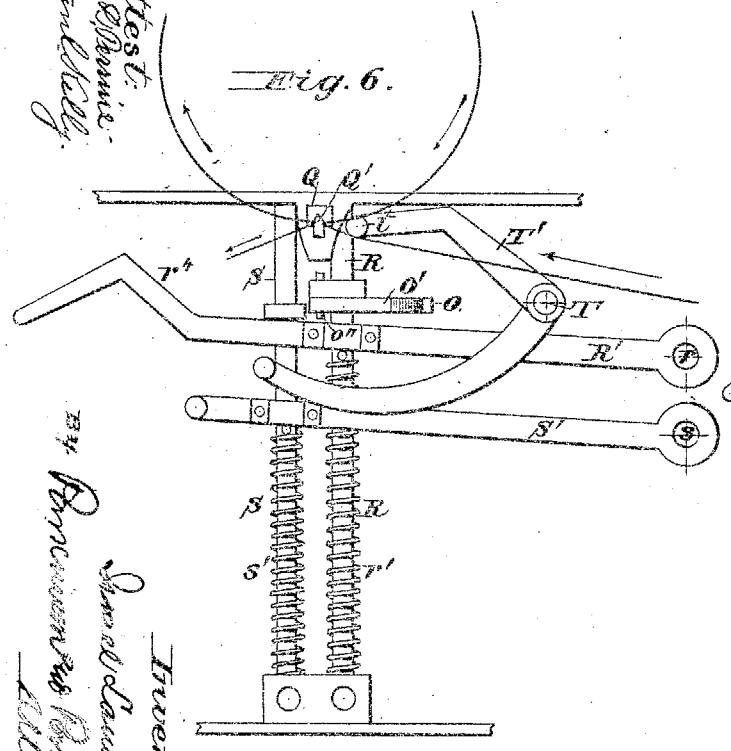

In the drawings, Figure 1 is a top-plan view of the machine, showing the method of communicating motion to the principal parts. Fig. 2 is an elevation of the mechanism operated by the sliding block M, (seen in the direction of the butt of the sheaf transverse to its axis.) Fig. 3 is an elevation of the same parallel with the axis of the sheaf. Fig. 4 gives top and bottom plan views of the block M, showing the cam-grooves and ledges with which it is provided. Fig. 5 is a plan view of certain of the parts in the train of mechanism depicted in Figs. 2 and 3. Fig. 6 is an elevation of the mechanism operated by the sliding block L, (seen in the direction of the head of the sheaf transverse to its axis;) Fig. 7, the same, showing the block in position for receiving the new end of the cord and the parts advanced in their operation; Fig. 8, a detached view of the block L, with its band-holding and band-cutting apparatus; Fig. 9, a plan view of the tripping device, by which the cord-holder upon the block is first opened and then tripped to to seize the cord; Fig. 10, elevations from opposite sides of the cord-clamp and its immediate actuating devices; Fig. 11, a section showing the cord in position around the sheaf, and in broken lines its position when acted upon by the device which fastens the ends or ties the knot; Fig. 12, a full-size vertical section through the axis of the shaft of the knot-tying device; Fig. 13, a bottom-plan view of the same, showing the spiral springs for partially operating the shaft; Fig. 14, a cross-section through the sliding frame U and grain-platform, on the line *z z*, Fig. 12, showing the mode of supporting the frame; Fig. 15, details of construction of the knot-tying device; Fig. 16, end views of the knotter, illustrating the mode of tying a knot; Fig. 17, a view of the band as it appears when around a sheaf, with the knot formed but not drawn tight; Fig. 18, a side elevation of the mechanism for throwing in and out of action the crank-shaft which operates the reciprocating driving-bars, the coupling being in section; Fig. 19, a side elevation of the device for operating the ejector or sheaf-discharger.

Motion is communicated to the binder by means of a chain-band running from some suitable driven part of the reaper to the rag-wheel A upon the shaft A′, mounted in bearings in the frame-work of the machine. This wheel is so timed relatively to the action of the reaper that it is given one revolution for every sheaf raked therefrom into the grain-receptacle or binding-platform. Its shaft is geared to the shaft B by means of the bevel-wheels *a b* at the rate of two revolutions of the latter shaft to each revolution of the former. A reciprocating motion endwise is imparted to the shaft B by means of the cam-wheel C, so that at one revolution its cranks $a'$ $a''$ $a^3$ $b'$ $b''$ $b^3$ shall be geared with one side of the bars D E F G and move them longitudinally to actuate their respective groups of mechanism, and at the ensuing revolution shall either be thrown out of gear entirely or be geared with the other side of the bars. The cam-wheel C, which controls this endwise movement of the shaft B, is formed with two segmental face projections or ledges, $c$ $c'$, as shown in Fig. 18. A yoke, C', swiveled at $c''$ to the end of the shaft, takes over the counter-shaft A'.

Journaled in the swiveled yoke-piece is a wheel or roller, $c^3$, which travels, as the cam-wheel revolves, upon the outer periphery of the ledge $c$ and on the inner periphery of the ledge $c'$, being forced by the inclines at the ends of these ledges to make a horizontal movement of, suppose, five-eighths of an inch in changing from one to the other, and communicating this movement to the shaft.

The bar E is attached by the connecting-rod $e$ to the short projecting arm or crank $e'$ upon the vertical rock-shaft E', from which projects also the long arm I. In like manner the bar F is connected with the rock-shaft F', having arm I', by means of the rod $f$ and crank $f'$, and the bar G with the rock-shaft G', having arms K K', by means of the rod $g$ and crank $g'$. As the bars reciprocate the shafts are rocked, and their projecting arms assume alternately the positions represented by broken and by full lines.

The wings or gatherers H H' are connected with the arms K K' by means of rods $h$ $h'$, the block L with the arm I' by the rod $l$, and the block M with the arm I by the rod $m$, and as the arms vibrate these parts (the gatherers and the blocks) are moved forward and back upon their respective guide-rods, as indicated by broken lines.

The jointed arm N, which takes the band from the holding devices on the block L and carries it around the sheaf when the latter has been bunched up by the gatherers, is geared with the bar D by means of the pinion $d$ upon its shaft $n$ and the rack $d'$ upon the bar, so as to be actuated by the reciprocations of the latter.

The ejector or sheaf-discharging arms J J, lying beneath the grain-receptacle, are at the proper time thrown to a vertical position to remove the bound sheaf through the instrumentality of a segmental gear, $j$, upon their shaft J', meshing into a sliding rack, $j'$, upon the bar F, this sliding rack being at the moment locked to the bar by means of a stop, $i$, projecting through the bar, as represented in Fig. 19, and held to its position by a spiral spring, $i'$, seated upon the bracket $i''$ and working against the pin $i^3$ on the stop. When the bar is moved in the direction indicated by the arrow the stop, protruding through the bar, comes in contact with and pushes the rack before it, causing the ejector-shaft to revolve and discharge the gavel. As the ejector-arms reach a vertical position a finger or projection, $j''$, upon the segmental gear strikes the stop and forces it down out of the way of the rack, which is at once caused to slide over it by the ejector-arms as they sink to their original position. On the return movement of the bar F the stop is again projected by the force of its spring, so as to be in readiness to actuate the rack and the ejector in the next forward stroke.

The cord is drawn from the usual spool mounted upon some part of the machine and conducted over suitable guides, D', into line with the path of the block L, by which it is seized and delivered to the binder-arm. As shown in Fig. 8, this block is formed with a sliding jaw, $l'$, sliding transversely to its path. Between the back end of this jaw and the fixed jaw $l''$ works a spiral spring, $l^3$, which tends constantly to hold the sliding jaw in contact with the fixed jaw, as indicated by dotted lines. These jaws constitute the cord-holder, into which the free end of the band material is placed, and by which it is held until taken by the binder-arm in its movement to encircle the sheaf.

Upon the pivot $o$, Fig. 10, is fixed the angular piece or elbow-lever O. In the long arm of this piece is formed a notch, $o'$, to receive the end of the bent bar O'. This bar is pivoted at $o''$, and is pressed away from the short arm of the elbow-piece by the coiled spring $o^3$, which conversely holds the long arm up against the end of the bar, so that they are normally latched together, the two being steadied in their movements to and from each other by a pin or dowel-rod which the spring encircles.

In the movement of the block L after the cord has been taken from it by the binding-arm, and as it approaches the position seen in Fig. 7, the back part or shank of the sliding jaw of the holder strikes the bent bar O' near its pivot and rides up the inclined part, the jaws being thereby opened and kept open until the shank reaches and comes in contact with the long arm of the elbow-piece, forcing it back so as to release the end of the bent bar from the notch when the bar yields to the force of the spring $l^3$, and the sliding jaw of the cord-holder closes against the fixed jaw to take a fresh hold upon the cord from the spool. In the return movement of the block in the direction indicated by the arrow, to deliver the new end of the cord to the binder-arm, this tripping device, which operates the holder, is again set or returned to position by its own action.

A knife, P, is pivoted to a lug, $l^4$, upon the block L, so as to shear across the edge of the jaws and cut the cord as it is held between them. This knife is operated at the proper time by the rod P', jointed thereto by a slot-and-pin connection, sliding in ways on the side of the block, and moved up against the cord by the action of a cranked lever, $p$. The lower end of the rod is bent at right angles, so as to bring it into position over the lever-arm by which it is actuated. A spring, $p'$, coiled about the rod and bearing against a collar or flange thereupon, constantly presses it down and returns it to place whenever it has been raised to cut the cord.

The crank-lever is connected by the rod $p''$ with the vertical lever P'', Figs. 2, 3, 5, which is mounted at the center upon a pivot passing through a slot therein, so that it may be permitted two motions, one in the direction of its length and the other upon its pivot as a fulcrum in the direction of the arrow. A coiled spring, $p^3$, holds the lever normally at the limit of its upward motion.

The binder-arm is provided near its point with jaws N′, to grasp the end of the cord, withdraw it from the holder on the block L, and retain it as it is carried around the sheaf, and at the proper moment, the block having reached the point at which it delivers the cord, the arm rises, takes the end presented by the holder, and moves with it into the position represented in full lines in Fig. 11. The free end of the cord and that portion running to the spool are by this action crossed close beneath the sheaf and on the under side of the stop Q, forming one jaw of the cord-clamp, which stop or jaw, previous to the action of the binder-arm, has been thrown across the narrow slot or opening in the grain-receptacle or binding-platform immediately under the center of the sheaf, so that as the gavel is encircled the cord from the spool is raised into contact with it on one side and the end held by the binder-arm is brought down against it upon the other. The cord is then clamped by the closing of the converse jaw or pinching-bar Q′ against the stop, and thus held between the sheaf and the knotter during the tying operation.

The jaw or stop Q slides in ways or guides beneath the binding-platform, and is operated by means of cam-plates $q$ $q'$ riveted to its side, between which lies the upper bent end of the vertical rod R. The lever R′, pivoted at $r$, operates to depress this rod, and the coiled spring $r'$ to raise and hold it up. When the rod is thrown down by the depression of the lever the stop Q is thrown out across the slot in the binding-platform by the action of the bent end of the rod upon its cam-surfaces, and is retained in this position by a bolt, $r''$, which catches into the notch $r^3$ in the lower end of the rod and temporarily holds it down. When the bolt is withdrawn the coiled spring returns the rod to place and the stop is withdrawn so as to leave the slot open. The opposite jaw or pinching-bar, Q′, lies beneath the stop Q, and is pivoted to a lever, $q''$, which in turn is pivoted to a lug, $q^3$, pendent from the lower side of the grain-receptacle. The power-arm of the lever passes between pins $p^4$ in the vertical reciprocating rod S, so as to be permitted the necessary play relatively thereto as it is caused to vibrate on its pivot by the reciprocations of the rod. The pinching-bar has a cam-surface, $h''$, which comes in contact with a cam-surface, $h^3$, depending from the framework or grain-receptacle. A lever, S′, pivoted at $s$, operates to depress the rod S, and a coiled spring, $s'$, tends to keep it raised. Upon depressing the lever S′ the rod is thrown down, and in turn depresses the lever $q''$, by which the pinching-bar is thrown forward and at the same time, by the action of the cam-surfaces, upward into contact with the stop. A bolt, $s''$, catches into the notch $s^3$ in the lower end of the rod and holds it in its depressed position so long as it is desirable the band should be clamped. When the bolt is withdrawn the coiled spring raises the rod to its original position, and the lower jaw or pinching-bar is opened and retracted.

The bolts $r''$ $s''$ play in a bracket, $d''$, on the frame, and are pressed forward to engage with their respective notches by coiled springs seated against this bracket and bearing upon pins projecting from the bolts. To the bolt $r''$ is attached an arm, $e''$, which plays against a pin upon the bolt $s''$, so that the two bolts will be simultaneously withdrawn from their notches by force applied to the longer bolt $r''$; but the latter will be free to enter its notch in the rod R, which is first depressed without reference to the former. The bolt $r''$ is connected by means of a horizontal lever, $e^3$, vibrating upon a vertical pivot, with an upright lever, Q″, which, like the adjacent lever P″, operating the cutter, is slotted for the reception of its pivot, and has both a lengthwise motion along the slot and a pivotal motion upon its fulcrum. Like that lever, also, it is normally held up by a coiled spring, $q^4$. These two levers are operated by the cam M′ on the lower face of the block M, as will be hereinafter described.

After the cord has been clamped beneath the gavel it is necessary that those portions in which the knot is to be tied should be brought together and into position for the action of the tying device. At the moment of clamping these portions flare away from each other, one leading to the spool and the other to the end of the binder-arm. On the shaft T is placed the cranked arm T′, bearing at the upper end the grooved wheel or pulley $t$. This is now brought into action in such manner that the grooved wheel is depressed, coming into contact with and depressing the spool portion of the cord to the position represented by dotted lines, thus bringing the vertical portion in front of the knotter and the horizontal portion between the jaws of the holder, by which it is immediately seized. The fore part of the jointed binder-arm, which, in its movement to encircle the gavel, was guided into its first position, and there retained by a pin, $c^4$, on the sliding block M, is now permitted by the recession of the block to fall to the second position, (indicated by dotted lines in Fig. 11,) carrying the other end of the sheaf-band into the grooved wheel $t$, when the cords are grasped by the knotting device. The further withdrawal of the binder-arm disengages the end of the cord therefrom, and the cutter being brought into action, the portion leading to the spool is severed between the gavel and the holder.

The block L is formed with projecting parts or lugs $d^3$ $d^4$, the former being inclined. As the block moves in the direction of the arrow the lug $d^3$, which, in the adverse movement of the block, had ridden upon and depressed the cranked arm T′, passes off of the end of the arm, which, by the action of a spring or counter-balance on its pivot, is returned from the position shown in Fig. 7 to that in Fig. 6. The lug $d^4$ then strikes the lever R′ at the bent part $r^4$ and forces it down, thus depressing the rod R and throwing the stop Q out across the slot in the grain-receptacle. Upon the return movement of the block the lug $d^3$ first strikes the power end of the lever S′ and depresses it, throwing down the rod S and operating the pinching-bar. The lug, in the continued movement of the block, next strikes the lower end of the cranked cord-placing arm and swings its upon its pivot, so as to bring the grooved pulley at the upper end down upon the spool end of the cord and place it in readiness for the action of the tying device.

The knotter is supported by a frame, U, which slides on ways U′ on the under side of the grain-platform, and has its motion limited by the stops $f''$ $f^3$. This frame sustains a shaft, V, one end of which is hooked or notched, as at $v$, and the other end of which carries the anti-friction wheel V′. The shaft plays endwise as far as the distance between the lugs $u$ and $u'$, in which it has bearings and by which it is stopped. A cross-bar, $v'$, is secured to the shaft, and against the ends of the cross-bar press the springs $v''$ $v''$, which are steadied by rods $v^3$ and $v^3$, secured at one end to the cross-bar and passing near the other through suitable guides pendent from the binding-platform, which form seats for the springs. By this arrangement the springs push back the shaft and cross-bar until the latter strikes the lug or bearing $u$, when the frame U, by the continued action of the springs, is forced against the stop $f^3$. The reverse movement of the shaft and sliding frame is accomplished by means of the lever X′, which acts against the roller V′. That part of the shaft which has its bearing in and passes through the lug $u$ is square, to prevent rotation upon its axis. The remaining portion, with the exception of the hook at the end, is round. Upon the shaft, and between the lug $u'$ and the hook, is placed the tube W. After the passage of this tube through the lug or bearing $u''$ and to within one-half of an inch of its end adjoining the hook, its external surface is worked square. The half of an inch at the end is formed round for the reception of the cord, which is to be looped about it, as shown.

Upon the square part of the tube is fitted the looper W′, working freely lengthwise of its bearing. The external surface of the looper is round, as seen in Fig. 15. To its outer end is fitted an arm, $w$, hooked at the end, and upon this arm is an angular spring, $w'$, which closes the hook, and a spring, $w''$, of steel wire, playing against the edge of the angular spring and of the arm. Projecting from the body of the looper is a pin, $w^3$, which takes into the cam-groove $x$ in the collar X, and as the looper is rotated causes the proper lengthwise motion to carry the arm $w$ successively into position to strike the cords, as at Z, Fig. 16, to pass behind the portion of the cords depending from the sheaf and above and over the tube, and to place the cords in the notch. The rotary motion is given by a groove in the reciprocating block L′ on the guide-rod $g''$ playing against the spiral thread $t'$ formed on the exterior of the tube W.

When the looper-arm $w$ is thrown against the cords from the gavel stretched between the clamp Q Q′ and the grooved wheel $t$ they open the spring $w'$, push down the spring $w''$, and pass in behind the hook, so as to be held by the pressure of the spring $w''$ against the opposing face of the arm. At this moment the cord leading to the spool is severed by the action of the cutter and the end held by the binder-arm released therefrom. The looper-arm then reverses its action and passes in the direction of the arrows, as at Z′, Fig. 16, entirely around the axis of the tube, so as to loop the cord around the cylindrical end thereof, and then, as it completes the revolution, it is thrown forward lengthwise of the tube, passing the ends into and across the knotting-hook $v$, as indicated in the drawings. The shaft V is then drawn into the tube by the action of the springs $v''$ $v''$, carrying the ends of the cord caught by the hook with it and through the loop, and the cross-bar, coming against the lug $u$, pushes back the sliding frame toward the stop $f^3$, slipping the end of the tube out from the loop, which falls over the part drawn in by the hook, so as to form the knot, as seen in Fig. 17. The clamp which holds the band beneath the gavel is then released, and the ejector throws the bound sheaf from the platform, drawing the ends of the band with it, from the jaws of the looping-arm, over the hook and out of the tube, the resistance offered insuring the tightening of the knot.

In order that the bight of the cord may be drawn into the tube without fraying, that part of the shaft which forms the hook has grooves $t''$ on either side, in which the strands may lie.

The block M, which operates the tying device, trips the cord-clamp, and brings the cutter into action, is formed as shown in Figs. 2, 3, and 4. Upon the upper face it has the cam-groove $k$, receiving a pin, $k'$, from the sliding block L′, which rotates the tubular portion of the knotter. On the lower side it has a cam-ledge, M′, formed with edge-bevels $m'$ and $m''$ and a face-bevel, $m^3$. This cam-ledge operates, by means of the bar $k''$, the lever X′, by which the knotting-hook and sliding frame are forced forward, and also the slotted levers P″ Q″, connected respectively with the cutter and with the bolts which hold the cord-clamp in action.

When the block M moves in the direction of the arrow, Fig. 4, the lug $k^3$ on the end of the bar $k''$ comes against and rides up the incline $m'$ of the cam-ledge M′, bringing the pin $x'$ in contact with and operating the lever X′, and thereby throwing out the knotting hook or shaft V and forcing the sliding frame against the stop $f''$. In the same time the pin $k'$ on the reciprocating block L′ has traveled over the straight portion $n'$ of the cam-groove $k$, and as the lug reaches the plane surface $m^4$ of the cam-ledge begins to ascend the incline $n''$ in the groove, moving the block L′ sufficiently to give the preliminary motion to the tube, by which the looper-arm is thrown out to grasp the cord, as in Fig. 16. The pin then reaches the straight portion $n^3$ of the groove and brings the block L′ to rest, while the head of the slotted lever P″ rides up the incline $m'$ on the cam-ledge, throwing up the cutter and severing the spool end of the cord, the binder-arm having at the moment been so far dropped by the recession of the block M as to release the other end. Both ends of the cord are now loose, yet held by the clamp beneath the gavel and by the looper-arm beneath the clamp, and the pin $k'$, reaching the incline $n^4$, begins to descend, starting the block and moving it in the direction opposed to its first movement, rotating the looper-arm, forming the loop around the cylindrical portion of the tube and carrying the cord into the hook. The lug $k^3$ then passes off of the cam-ledge, releasing the sliding frame and shaft, which spring back and complete the formation of the knot, and the incline $m'$ comes in contact with and forces aside the head of the slotted lever Q″, withdrawing the bolts $r''$ $s''$ from the rods R S, whereby the cord-clamp is thrown open and retracted clear of the slot in the grain-table, and the band is released, so that the completed sheaf may be thrown from the table by the ensuing action of the ejector. In the return movement of the block M the cam-ledge, by means of its inclined face $m^3$, rides over the slotted levers, forcing them lengthwise downward without operating the cord-cutter or tripping-bolts, and by means of its inclined edge $m''$ pushes back the rod $k''$ against the coiled spring $x''$, which returns it, when the ledge has passed by, into position to be again actuated by the first incline.

I will now briefly recapitulate the consecutive operations of the machine.

The rake of the reaper first rakes the cut grain onto the platform of the binder and between the sliding wings. These wings then approach each other toward the center of the platform, carrying the grain with them and bunching it up to a width of, say, eighteen inches. The binder-arm next rises through the slot in the platform, taking the cord from the cord-holder upon the block L as it does so and passing it around the gavel and beneath the platform on the other side. The movement of the block M now closes the hinged fore part of the binder-arm, compressing the sheaf and crossing the band on the under side of the stop or upper jaw of the cord-clamp, and the lower jaw or pinching-bar is brought down upon it by the action of the block L. The cord-placing lever is depressed to place the spool portion of the cord between the jaws of the cord-holder and in position to be grasped by the knotter, and the binder-arm opens, carrying the other end into the grooved wheel at the end of the lever, by the side of the first, when they are seized by the looper-arm. The respective ends of the band are then simultaneously severed from the spool portion and drawn from the binder-arm, after which the looper-arm finishes its movement and the sliding frame is thrown back, completing the knot. The cord-clamp is now tripped to release the band and the binder-arm returned to its position beneath the platform, when the sheaf is ejected, and simultaneously therewith the cord-holder and its block returned with the cord for the next sheaf.

I claim as my invention—

1. In an automatic binder, a clamp for the ends of the band located immediately beneath the grain-receptacle, so as to be applied close to the gavel and between it and the band-securing mechanism.

2. In combination with the mechanism by which the ends of the band are united, a clamp for the band located between said mechanism and the gavel.

3. In combination with the mechanism by which the ends of the band are united, a clamp intermediate to it and the grain-receptacle, and mechanism actuating said clamp to seize and hold the contiguous portions of the band close to the side of the gavel before and while its ends are being united.

4. In combination with mechanism by which the ends of the band are united, a clamp located immediately beneath the gavel and mechanism operating to hold the ends of the band stretched from said clamp past the band-securing device until seized by the latter.

5. In combination with mechanism by which the ends of the band are united, a clamp for the band located immediately beneath the gavel, and a cutter on the other side of the band-securing mechanism, by which the band material is severed after it has been clamped and before its ends are united.

6. In combination with mechanism by which the ends of the band are united, a clamp located immediately beneath the gavel, a cutter on the other side of the band-securing mechanism acting to sever the band material after it has been clamped and before its ends are united, and a holder by which the new end is seized and held.

7. In combination with mechanism by which the ends of the band are united, a clamp located immediately beneath the gavel, mechanism operating to hold the ends of the band stretched past the band-securing device until grasped by the latter, and mechanism by which the band is severed from the spool portion after it has thus been grasped.

8. In combination with the binder-arm or band-carrier, a clamp immediately beneath the gavel, by which the contiguous portions of the band are seized and held when they have been brought together around the gavel, and mechanism beyond for uniting the ends of the band, actuated after the clamping action begins.

9. In combination with mechanism for tying a knot in the ends of the band, a cord-clamp, by which adjacent portions of the band material are seized and held in close proximity to the surface of the gavel while the knot is formed in the end beyond.

10. In a cord-knotter, the combination of a tube over the cylindrical end of which the loop is formed, a rod or shaft reciprocating through the tube and adapted to catch the ends of the cord and recede with them into the tube, and a looper-arm moving about the axis of said tube and lengthwise thereof to lay the loop and place the ends in position to be caught by the rod.

11. The combination of the tube upon which the loop is formed, the hooked rod or shaft reciprocating therein, and the looper-arm, provided with a clasp to seize and retain the ends of the band and moving about the axis of the tube to lay the loop and place the ends in the hook.

12. In combination with the tube upon which the loop is formed and with the arm by which the loop is laid, the hooked rod or shaft reciprocating in said tube and grooved at its sides to receive the bight of the cord as it is drawn into the tube and through the loop.

13. In combination with the tube upon which the loop is formed and with the hooked rod by which the ends of the band are drawn into the tube and through the loop, the looper-arm formed with spring-jaws to seize and pay out the cord.

14. In combination with the cord-clamp, the device by which the cord is stretched from the clamp past the knotter, and the band-cutting mechanism, the looper-arm formed with spring-jaws and actuated to seize the cord in its stretched condition and before it is severed.

15. In combination with the tube upon which the loop is formed and the device for drawing the ends of the cord through said loop, a looper-arm moving about the axis of said tube and holding the cord resistingly and yieldingly, so as to lay a tight loop.

16. In combination with the tube upon which the loop is formed and the device for drawing the ends of the cord through said loop, a looper-arm carrying the cord about said tube and holding it resistingly and yieldingly, so as to give stress to the bight as it is withdrawn through the loop.

17. In combination with mechanism for forming the knot in the ends of the band, independent mechanism for forcibly withdrawing the band therefrom after the knot has been laid and while the cord is still grasped in the knotting devices, to tighten the knot.

18. In combination with the knotter, a sheaf-ejector geared to be brought into action after the knot has been laid and the bight passed through the loop and while it is still held by the tying devices, so as to forcibly withdraw it therefrom.

19. The combination of the tube upon which the loop is formed, the rod or shaft reciprocating therein, the looper-arm moving about the axis of said tube and lengthwise thereof and provided with jaws to catch and hold the cord, and mechanism which first actuates the looper-arm to seize and lay the cord, then withdraws the rod to carry the bight through the loop, and finally withdraws the tube to slip the loop from its end.

20. In combination with the binder-arm and band-securing mechanism, an independent arm or finger beneath the floor of the binding-table and moving across the path in which the cord is stretched to place it in position to be seized by said mechanism.

21. In combination with the binder-arm and the band holding and cutting mechanism, an independent arm or finger beneath the floor of the binding-table and moving across the path in which the cord is stretched to place it between the jaws of the holder in position to be cut.

22. In combination with the cord-clamp beneath the gavel and the band-securing mechanism, an arm acting after the cord has been grasped by the clamp to conduct it into position to be seized by said mechanism.

23. In combination with the cord-reel and binder-arm, a bar actuated to project across the slot in the grain-receptacle beneath the gavel, so that the cord may be crossed thereupon as it is laid.

24. In combination with the cord-reel and binder-arm, a bar actuated to project across the slot in the grain-receptacle beneath the gavel, so that the cord may be crossed thereupon as it is laid, and a clamping-bar actuated after the cord has been crossed to clamp it against the first-named bar.

25. The sliding frame U, acting in combination with the notched shaft V, arm $w$, with the springs upon it, and the piece W′, to which it is attached, collar X, with the groove $x$, into which takes the pin $w^3$ to give the longitudinal motion to the piece W′, tube W, with the spiral thread $t'$ upon it, and the block L′, which gives the rotary motion to the tube, all constructed, arranged, and acting in the manner and for the purpose set forth.

26. The sliding block M, having the irregular groove $k$, to operate the block L′, and the irregular piece M′, to throw out the sliding frame U to operate the lever P″, which cuts the cord, and to operate the lever Q″, which releases the sheaf-band, constructed in the manner and for the purpose set forth.

27. The device for opening the clamps to release the sheaf-band, consisting of the lever Q″, the two bars $r''$ and $s''$, and the arm $e''$, constructed in the manner and for the purpose set forth.

28. The mechanism for cutting the cord, consisting of the lever P″, the bar $p''$, the elbow-lever $p$, the rod P′, and the knife P, constructed for the purpose and in the manner set forth.

29. The sliding jaw $l'$, with its spiral spring $l^3$, and the tripping device, consisting of the spring-pressed latch O and cam-arm O′, acting in combination in the manner and for the purpose set forth.

30. The projection $d^3$ and the block $d^4$, in combination with the levers R′, S′, and T′, the wheel $t$, the rods R and S, the bars Q and Q′, and the lever $q''$, all constructed in the manner and for the purpose set forth.

31. The device for giving the longitudinal motion to the shaft B, consisting of the wheel C, mounted on the counter-shaft A′, and formed with segmental projections or cam-flanges $c$ and $c'$, the yoke C′, coupled to the end of the shaft B and taking over the shaft A′, as described, and the wheel $c^3$, attached to said yoke and traveling on the cam-flanges, as and for the purpose set forth.

32. The sectional gear $j$, with its projection $j''$, the sliding rack $j'$, and the stop $i$, with the spring $i'$, operating in combination in the manner and for the purpose set forth.

33. The reciprocating bars D E F G, constantly traveling in parallel paths without lateral motion, the connecting-rods $e$ $f$ $g$ and $h$ $h'$ $l$ $m$, the short arms $e'$ $f'$ $g'$, and the long arms I I′ K K′ on the vertical shafts E′ F′ G′, all acting in combination in the manner and for the purpose set forth.

34. The trip for actuating the cord-holder, consisting of the pivoted latch O, cam-arm O′, and the spring by which they are normally forced into engagement, substantially as described.

ISRAEL LANCASTER.

Witnesses:

WALTER R. YATES,

D. G. RANEY, Jr.